C. G. SÖDERLUND.
BALL BEARING WITH A SINGLE ROW OF BALLS.
APPLICATION FILED DEC. 11, 1914.

1,266,071.

Patented May 14, 1918.

WITNESSES
Charles B Crompton
May G. Luttrell

C. G. Söderlund.
INVENTOR
BY
ATTORNEY

C. G. SÖDERLUND.
BALL BEARING WITH A SINGLE ROW OF BALLS.
APPLICATION FILED DEC. 11, 1914.

Patented May 14, 1918.

C. G. Söderlund
Inventor

UNITED STATES PATENT OFFICE.

CARL GUSTAF SÖDERLUND, OF GOTTENBORG, SWEDEN.

BALL-BEARING WITH A SINGLE ROW OF BALLS.

1,266,071.  Specification of Letters Patent.  Patented May 14, 1918.

Application filed December 11, 1914. Serial No. 876,608.

*To all whom it may concern:*

Be it known that I, CARL GUSTAF SÖDERLUND, a subject of the King of Sweden, residing at Gottenborg, in the county of Gottenborg and Bohus and Kingdom of Sweden, have invented new and useful Improvements in and Relating to Ball-Bearings with a Single Row of Balls, of which the following is a specification.

This invention relates to ball bearings with a single row of balls which are movable in grooves formed in the outer race ring and in the inner race ring.

The object of my invention is to provide means for automatically removing from the bearing surfaces any alien particles such as dust, filings or the like which may not have been removed from the bearing when manufactured or which may have accumulated in the grooves, such particles or impurities having a tendency to wear, and scratch or cut into the bearing surfaces and to prevent the smooth running of the balls.

In carrying the invention into effect I provide the outer race ring with one or more cut away portions or openings formed in the wall or walls of the race ring which opening or openings extend from the very bottom of the groove in said ring and slope outwardly to the side or sides of the ring. Preferably the opening or openings are situated at the lowermost portion of the bearing and each opening may be directed to only one side or to both sides. When situated at the undermost point of the bearing the opening or openings cause the particles or impurities to escape merely by the action of gravity, whereas an opening situated at a higher point will only serve the above mentioned purpose if assisted by centrifugal force.

The opening or openings may best be described as cutaway portions of the wall or walls of the groove, and as a consequence the bearing is freed from any spot suited to the accumulation of impurities or other alien particles injurious to the smooth working of the parts. Said particles will escape from the race immediately they reach the cutaway portion or opening and their removal may be assisted by a few drops of paraffin or the like introduced before the bearing is put into operation.

In the accompanying drawing—

Figure 1:
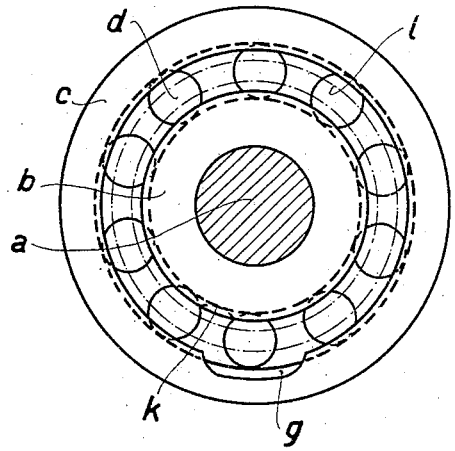
Figure 1 is a side elevation of the bearing.
Figure 2:
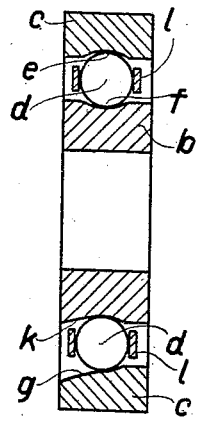
Fig. 2 is a sectional view of the same showing a single opening.
Figure 3:
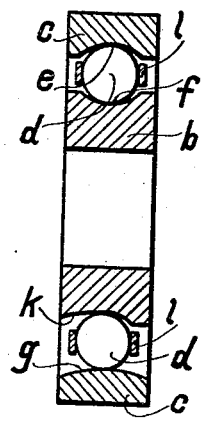
Fig. 3 is a sectional view of the same showing a double opening.

The bearing comprises as usual an inner ring or race $b$ fixed on the shaft $a$, an outer ring or race $c$ and a set of balls $d$ placed between the two rings and kept in place by a suitable cage $l$. The balls run in grooves $e$, $f$ formed respectively in the rings $c$, $b$. In accordance with this invention there is provided an opening or cut away portion $g$ of a suitable length in the outer race ring this opening being at the lowermost portion of the ring and extending from the very bottom of the groove $c$ outwardly and downwardly to the sides of the ring, as shown in Fig. 2. The opening may extend to only one wall of the ring $c$, as shown in Fig. 2, or it may extend to both side walls thereof as at Fig. 3, and openings may be provided at a plurality of points around the circumference of the outer ring. The balls are prevented from falling when passing the opening or openings $g$ of the groove $e$ by the cage $l$.

Referring to Fig. 2 the opening or openings $g$ also presents a convenient means for inserting or removing the balls, and this will be rendered very much easier if the inner ring or race $b$ is also provided with a small opening $k$, sloping downwardly to the outermost circumference of the inner ring from the bottom of the groove $f$ in said ring. By turning the inner ring $b$ until its opening $k$ is immediately above the opening $g$ in the outer ring there will be provided a spacious opening for inserting or removing the balls $d$ and as the two openings $g$ and $k$ are extended entirely to the bottoms of their respective grooves $e$ and $f$, no force will be necessary for inserting the balls through the channel formed by the momentarily coinciding openings $g$ and $k$.

Having thus described my said invention what I claim and want to protect by Letters Patent is:

A ball bearing, comprising in combination, an outer race ring having a groove formed in the innermost surface thereof, an inner race ring formed with a groove on the outermost surface thereof, a row of balls arranged between said surfaces and running in said grooves, and means for retaining said balls in position, said outer race ring being formed at the lowermost part thereof with a circumferentially extended opening which extends from the bottom of the groove outwardly and downwardly to the side wall of the ring, throughout the entire circumferential length of the opening, the inner ring being provided with an opening extending in axial direction from the bottom of the groove outwardly to the periphery of the side wall of the ring, said rings being relatively movable in assembling the bearing to bring said openings into coincidence.

In testimony whereof I have hereunto set my hand in presence of two subscribing witnesses.

CARL GUSTAF SÖDERLUND.

Witnesses:
 ERIC MIDHOLM,
 ILSE LINDUN.

Copies of this patent may be obtained for five cents each, by addressing the "Commissioner of Patents, Washington, D. C."